Feb. 5, 1952 — F. W. LEFFER — 2,584,391
APPARATUS FOR EFFECTING FLUIDIZED CONTACT
BETWEEN SOLID PARTICLES AND FLUID MEDIUMS
Filed March 29, 1947
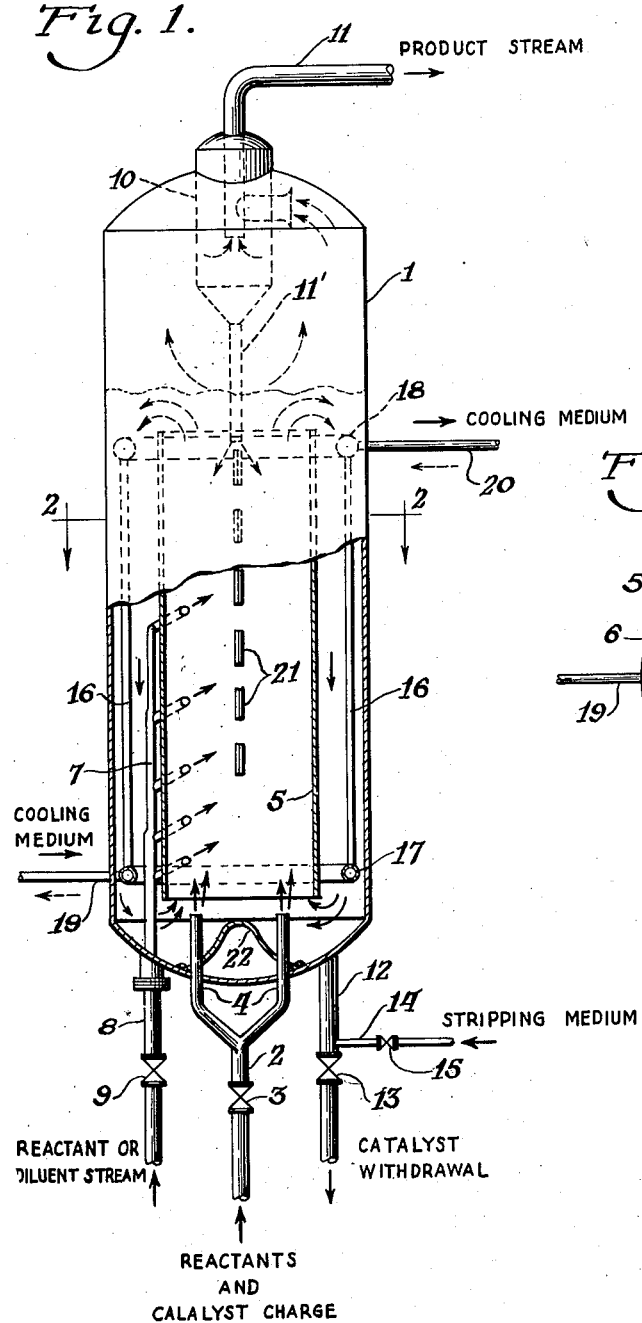
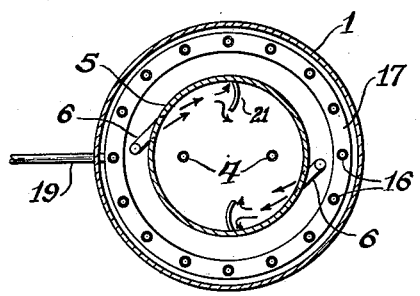
INVENTOR.
Frederick W. Leffer
BY
Maynard P. Venema Patented Feb. 5, 1952

2,584,391

UNITED STATES PATENT OFFICE 2,584,391

APPARATUS FOR EFFECTING FLUIDIZED CONTACT BETWEEN SOLID PARTICLES AND FLUID MEDIUMS

Frederick W. Leffer, Riverside, Ill., assignor to Universal Oil Products Company, Chicago, Ill., a corporation of Delaware Application March 29, 1947, Serial No. 738,130

5 Claims. (Cl. 23—288)

This invention relates to an improved method and apparatus for contacting finely divided solid particles with a fluid medium or mediums in order to effect a more intimate contact between the two in a fluidized bed, and to attain a more efficient and effective conversion. The invention is particularly directed to improved means for carrying out catalyzed vapor or gas reactions, such as catalytic chemical or hydrocarbon conversion operations, or such synthesis reactions as the Fischer-Tropsch process, wherein carbon-monoxide and hydrogen are synthesized into hydrocarbons with the aid of a particulated catalytic material.

It is a principal object of the invention to provide a method and means for carrying out fluidized solid particle contacts in a manner which is non-mechanical and provides rotative agitation between the contacting materials, and in an operation adaptable for either endothermic or exothermic reactions.

It is also an object of the invention to provide a contacting chamber and method of operation which maintains a cyclic circulation of the solid materials such that the utmost benefit may be derived from its use in any desired conversion.

It is a still further object of the invention to provide improved means for introducing a second reactant or diluent stream to a fluidized contacting zone, whereby the introduction of the auxiliary stream aids in producing a high velocity fluidized and agitated contact bed.

In all catalytic conversion processes, it is especially desirable to obtain a uniform and substantially complete exposure of catalyst surface to a reactant stream. The fluidized method of contact, which is now generally known in the processing art, provides an efficiently operating process, since the catalyst is in a finely divided state and provides a relatively large effective surface area to the reactant stream, while the turbulent "hindered-settling" action within the contact zone provides a relatively favorable method of insuring uniformity and completeness of contact between the solid and fluid mediums.

The improved method of operation made possible by this invention, provides for a rotative agitation within a centrally positioned fluidized rising column of reactants and finely divided solid particles. The operation simultaneously provides for a separation between the reaction products and their finely divided solid particles within the upper portion of the contacting zone whereby the solid particles may be permitted to fall in a slower moving, denser phase, descending column and thus be recycled to the turbulent fluidized rising column within the contacting zone. Additional portions of the fluid reactant stream, or stream of an inert or diluent medium are introduced to the central upwardly rising stream of fluidized contact material in a novel manner, which provides an increased velocity and rotative motion to this fluidized column of fluid and solid materials. Various specific ways of introducing these materials to the contact chamber, and for providing the cyclic flow therein, are hereinafter described and explained. A method for controlling temperatures within the recycle passageway of the contacting chamber is such as to make the improved apparatus particularly useful in processing exothermic reactions, such as in the regeneration of a heat-sensitive catalytic material, or in carrying out the aforementioned Fischer-Tropsch process, wherein the temperature must be closely controlled to effect an efficient synthesis.

Various types of contacting apparatus have made use of mechanically driven propeller blades, and the like, to provide increased turbulence and agitation between gaseous mediums and solid particles, as well as between liquid reactants and catalysts; however, the moving parts of the apparatus such as the necessary shafts, blades and bearings, are subject to undue wear under the influence of the corrosive or erosive action of solid particles and fluid reactants at the conversion conditions of temperature and pressure so that the operation of such contacting apparatus is difficult and costly and frequently results in an early breakdown of the apparatus. It therefore may be seen, that a contactor which eliminates the need of mechanically operated mixing or stirring devices, is not only advantageous from the point of view of decreasing construction cost, but is advantageous in that operating difficulties may be substantially eliminated.

Broadly, this invention provides an improved method for contacting sub-divided solid particles and a fluid medium by passing said solid particles and a fluid medium, such as reactant fluid, in a fluidized column upwardly into and through a confined path within a contacting zone introducing additional portions of fluid medium at spaced intervals to the upwardly moving column and providing thereby increased agitation and contact between the particles and fluid medium within the upwardly moving fluidized column, discharging the fluidized column from the confined path into a separating zone of substantially increased cross-sectional area in the upper portion of the contacting zone and therein separating contacted solid particles from fluid medium, passing the separated particles in a descending column within said contacting zone and outside said confined path to the lower portion of said contacting zone and returning at least a portion of the solid particles from the lower portion of the descending column to the upwardly moving fluidized column.

In a more specific embodiment of the invention, the improved method of contacting is directed to the conversion of gaseous or vaporous reactant streams in the presence of a sub-divided solid catalytic material in a manner which provides charging the catalyst and a reactant stream to a contacting zone and therein upwardly into a rising fluidized column confined centrally within the contacting zone, maintaining the reactant stream at conversion conditions in said rising column, separating gaseous or vaporous reaction products from the catalyst particles in a separating zone confined within the contacting zone above said rising column and having a substantially larger cross-sectional area than said confined rising column, recirculating the separated catalyst particles in a descending column annularly enveloping the upwardly rising fluidized column of reactant and catalyst materials, and having a greater density than that of said rising column, introducing additional gaseous reactant streams at vertically spaced intervals tangentially to the centrally confined rising fluidized column and imparting thereby a rotative motion to the rising fluidized column and an increased agitation and contact of the solid particles and the gaseous reactants therein, controlling the temperature within the outer descending column of catalyst particles and returning at least a portion of the latter to the centrally confined rising column under controlled temperature conditions, and separately withdrawing reaction products and contaminated catalyst particles from the contacting zone.

The accompanying drawing will serve to illustrate a typical embodiment of the improved apparatus of this invention, while the subsequent description thereof will serve to clarify the improved method of operation.

Figure 1 of the drawing is an elevational view, partially in section, of the improved contacting chamber.

Figure 2 of the drawing is a sectional plan view through the chamber, indicating the orientation of the various internal portions of the apparatus, as indicated by line 2—2 in Figure 1 of the drawing.

Referring now to both Figures 1 and 2 of the drawing, there is shown a substantially vertical chamber 1 which is suitable for use in any one of the aforementioned conversion processes as a contacting chamber for gaseous or vaporous medium and finely divided solid particles. A fluid reactant stream is charged together with sub-divided contacting material, catalytic or otherwise, to the lower end of the contacting chamber by means of the conduit 2, having control valve 3. The conduit 2 may be split into two or more lines 4 such that the charge streams enter the lower portion of the contact chamber 1 in a more uniformly distributed manner. A continuous partitioning wall 5, which is preferably cylindrical, is positioned centrally within the chamber 1, providing thereby an inner contacting zone and an annular space. Connecting tangentially with the partitioning wall 5 are a plurality of inlet lines 6, which in turn connect with a header conduit 7 and a supply conduit 8 having a control valve 9. The tangential inlets 6 are preferably spaced vertically within the lower portion of the inner contacting zone, provided by wall 5, such that the upwardly rising fluidized column of materials, charged by way of lines 4, is given a rotative or centrifugal motion. The stream introduced through line 8 and the various tangential inlets 6 may be a portion of the reactant stream, a diluent stream, an inert fluid medium, or another reagent stream which it is desired not to combine with the reactant stream within line 2 until the different fluid streams reach the reaction zone.

The introduction of the reactants and subdivided solid contact material is preferably made in a continuous manner such that they rise in a continuous and turbulent stream through the inner contact zone to the portion of the contact chamber 1 wherein the enlarged cross-sectional area above the partitioning wall 5 permits a reduction in velocity and a partial separation between the gaseous or vaporous products and the solid particles. In order to provide a substantial and complete separation of the contact material from the outgoing product stream, a centrifugal type separator 10 is indicated which will in turn permit the discharge of the product stream, by way of line 11, while separated solid particles are collected and returned, by way of pipe 11', to the dense fluidized zone within the central portion of the contacting chamber. A gravity separation of solid particles from the fluidizing reactant and product streams also takes place within the upper portion of the contacting chamber above the annular zone provided between the partitioning wall 5 and the outer wall of the chamber 1, such that the particles descend through the annular passageway to the lower end thereof and to the lower end of contacting chamber 1 at a lesser velocity and a greater density relative to the central rising column. Within the lower zone of the chamber 1, the solid particles will be caused to reenter the inner contacting zone by virtue of the upwardly rising column effected by the streams introduced through lines 4. The recirculation of the solid contact material in the cyclic flow path provides for a most efficient and beneficial use of the material, particularly when it is of a catalytic type, although a desired beneficial use may also be derived from a heat carrying contact material which is recirculated under controlled temperature and heat exchange conditions within the contacting chamber. The supply of the streams through lines 4 in the normal operation of the process is maintained at a rate sufficient by itself to secure a fluidized phase of solid particles and reactant in the central up-flow path, and the addition of fluid streams through the tangential inlets 6 is not required for obtaining such fluidized state but causes the added streams to cut into and across the vertical flow of the rising column, thereby assuring greater intimacy of contact along the height of this column and substantially reducing the breaking-through or bubbling-up and channelling of reactant fluid through the fluidized bed.

A portion of the solid contact material may be continuously removed by way of line 12 having a control valve 13. At the same time, a stripping medium may be charged to the solids withdrawal line 12 by way of line 14 having valve 15, such that the solid particles may be stripped of contaminating vaporous and gaseous products which adhere to the solid particles or are entrained in the withdrawal stream. Although not shown in the drawing, additional stripping medium may be supplied, if so desired, at one or more points along the lower periphery of the vertical walls of chamber 1 into the lower part of the annular descending column to aid in the separation of fluid reaction products from the solid particles prior to returning at least a substantial portion of the latter to the rising column. The stripping medium normally is comprised of an inert medium such as steam, nitrogen, or the like, which may enter the reaction or contacting zone without causing any substantial harm to the desired conversion being carried out therein.

A heat exchanger unit comprising a plurality of vertical tubular members 16, a lower header 17, and an upper header 18 is placed within the annular passageway wherein solid particles pass downwardly in a cyclic recirculation path. A heat exchanger is not necessary in certain conversion operations; however, temperature control is particularly advantageous in many operations, such as catalyst regeneration, dehydrogenation, or hydrocarbon synthesis reactions, and the construction of the present unit is such as to readily incorporate a heat controlling unit. The cooling or heating medium may be charged to the lower header 17 by way of inlet line 19, and the medium discharged through the upper header 18 and outlet 20, such that the heat exchange medium is passing in a generally countercurrent direction to the descending solid particles within the annular space. In an alternate operation, if it is deemed desirable, the heat exchange medium may be charged to the upper header 18 by way of line 20, and discharged from the exchanger through line 19, such that the medium passes through the tubular heat exchange members 16 in a flow concurrent with the descending annular column and countercurrent to the central, rising fluidized bed within the contact chamber. The drawing indicates ordinary tubular elements 16; however, it is within the scope of this invention to use a more elaborate construction involving finned tubular elements in order to provide heat exchange elements of increased efficiency.

Other desirable features of the apparatus include the spaced baffle fins 21 within the central contact zone, provided by partitioning member 5, and the curved baffle member 22 which is positioned within the lower head of the contacting chamber 1. The baffle member 22, is desirable in a preferred embodiment of the apparatus to aid in the cyclic flow which is carried out within the unit, and in addition it will prevent having a relatively dead zone wherein sub-divided solid particles might have a tendency to settle out of the fluidized streams. The small spaced baffles, or fin members, 21 serve to provide additional turbulence within the primary contacting zone. As hereinbefore noted, the fluid streams introduced tangentially through lines 6 provide a rotative motion to the upwardly rising fluidized bed of material within the contacting zone and an increased velocity of the vaporous or gaseous medium and of the solid particles; however, to preclude any centrifugal separation of particles from the fluidizing reactants, the spaced fins 21 will provide an intermittent interrupting action which causes a high degree of turbulence and agitation between the contacting materials.

As one example of the advantageous operation of the improved unit, the invention may be applied to the cracking of two different hydrocarbon stocks in the presence of a finely divided catalyst, one being somewhat more refractory than the other. The more refractory stock, together with entrained catalyst, is charged to the lower end of the inner contacting zone by means of conduit 2 and lines 4 such that there is maintained a fluidized dense phase bed of the reactant stream and the catalyst in the ascending column confined by cylinder 5. The less refractory charging stock may be introduced, with or without catalyst, through conduit 8 and the header member 7 to the various inlet lines 6. This latter reactant charge will provide the desired rotative and increased velocity motion to the fluidized bed and therein effect a contact with the catalyst. The delayed introduction, however, provides a shorter contact time with the catalyst, while the more refractory stock, introduced at the lower end, obtains a relatively greater contact time with the catalyst and the desired conversion is attained in an effective manner.

Where a catalytic operation in accordance with the present invention is such that the catalyst becomes substantially carbonized or deactivated within a relatively short period, the catalyst particles of the descending annular column may be largely withdrawn from the lower end of the chamber by way of outlet 12 while only a minor portion of the catalyst is recirculated from the annular zone into and upwardly through the inner contacting zone and fresh or regenerated catalyst is supplied to the latter at substantially the same rate at which contaminated catalyst is withdrawn. However, where the catalyst may be used for a relatively long contacting period, or the catalyst is used at relatively low activity, with low conversion per pass, then the charge rate of the catalyst and its withdrawal rate may be adjusted to provide the direct recirculation of substantially a major portion of the solid material within the contacting chamber.

In another illustration of utilizing the process and apparatus of this invention, aromatic hydrocarbons and lower boiling unsaturated hydrocarbons, particularly normally gaseous olefins may be produced from a normally liquid hydrocarbon oil distillate in the presence of finely divided alumina-chromia or other refractory catalyst suitable for this conversion reaction at aromatizing and dehydrogenating temperature, generally of the order 1050–1250° F. The distillate charge, preferably preheated to a temperature below cracking or reaction temperature, is supplied through conduit 2 and branch lines 4, together with catalyst particles, which have been regenerated outside chamber 1, and are passed at reaction temperature together with catalyst directly recirculated from the annular zone upwardly through the central confined reaction zone as a fluidized dense phase. Superheated steam or other diluent is supplied at a temperature somewhat above reaction temperature and preferably at a temperature between about 1100° and 1400° F. through the header 7 and outlet 6 into the rising fluidized column. The multi-point tangential injection of the superheated, chemically inert diluent results in the supply of heat for the endothermic reaction as well as in providing a closely controlled uniform reaction temperature throughout the rising column, a thorough agitation of the fluidized bed, and the distribution of substantially uniformly active catalyst throughout the operation, so that optimum yields of aromatic and unsaturated hydrocarbons will be obtained by this high temperature conversion reaction. Due to the uniformity of reaction conditions throughout the reaction space, excessive side reactions and catalyst contamination are kept at a minimum and only a minor portion of the catalyst need be withdrawn as a stream through line 12 for regeneration and return through line 2.

To illustrate the operation of the present unit in an exothermic process, such as in the Fischer-Tropsch synthesis of hydrocarbons, a charge stream of carbonmonoxide and hydrogen may be charged to the lower end of the unit by way of conduit 2 and lines 4 and is commingled with the major portion of the particulated mass of synthesis catalyst issuing from the annular zone so that a fluidized bed is formed in the lower part of the central contacting zone. Recycle gas, which has been separated from the conversion products, is charged to the reaction zone through conduit 8, header 7 and tangential inlet lines 6 at a temperature somewhat below reaction temperature such that the reaction temperature in the fluidized bed of the central rising column is maintained substantially uniform over the whole height thereof and the catalyst mass is kept in circulation at a greater rate, and with resultant materially greater uniformity of catalytic action than is attainable by the supply of the carbonmonoxide-hydrogen mixture to the lower part of the reactor. The dissipation of the heat of reaction is augmented by a cooling medium which is passed upwardly through the heat exchanger tubes 16, provided in the annular zone between the wall 5 and the side wall of chamber 1. This cooling medium is preferably water which is partially vaporized under a pressure controlled so as to withdraw the appropriate amount of heat from the circulating mass of sub-divided solid iron or other synthesis catalyst and thereby assure the maintenance of a constant temperature substantially uniformly throughout the central rising column. In this operation it is advantageous to use a portion of the lean recycle gas or, preferably, hydrogen as such for stripping the catalyst particles in the descending annular column, and only a rather small portion of the catalyst particles need be withdrawn either continuously or periodically from the reactor and subjected to regeneration treatment for the removal of adsorbed high-boiling or waxy hydrocarbonaceous deposits therefrom before its return to the central rising column in order to maintain a satisfactory average catalytic activity for prolonged periods of operation.

As a further illustration of the applicability of the present process and apparatus to exothermic reactions there may be mentioned the catalytic hydrogenation of organic compounds and the regeneration of catalysts. In the catalytic hydrogenation of organic compounds, particularly in the saturation of olefinic polymers for the production of aviation fuel hydrocarbons and in the selective hydrogenation of unsaturated cyclic hydrocarbons, as well as in the "hardening" of oils of non-mineral origin, the hydrogen is introduced in multiple streams through the openings 6 of upwardly increasing distances from each other along the height of the fluidized bed of organic compound and finely divided solid hydrogenation catalyst so that a substantially uniform hydrogen concentration is maintained throughout the height of the fluidized bed of the reaction zone, and the hydrogen streams may at the same time serve the control of the hydrogenation reaction temperature either with or without the aid of controlled indirect heat exchange between the circulating catalyst mass in the annular descending column and a cooling fluid passing through the tubes 16.

In the regeneration of catalysts the invention is particularly advantageous in the reactivation of solid refractory catalyst particles contaminated by carbonaceous deposits and requiring a closely controlled temperature for the combustion of such deposits and for the input of heat to the regenerated catalyst for subsequent use in a catalytic process. The contaminated catalyst is supplied through conduit 2 and branch lines 4 together with a fluidizing medium such as, for example, steam or flue gases. In some instances it may be desirable to use a portion of the oxygen or oxygen-containing gas such as air required for the regeneration treatment as the fluidizing medium for the catalyst supply. In any event, either the whole or the balance of the regenerating gas comprising oxygen for combustion of the carbonaceous deposits is introduced tangentially to the fluidized bed in the central rising column through the openings 6 spaced at upwardly increasing distances whereby the temperature of regeneration is rendered extremely uniform throughout the rising column, due to the intense agitation, and localized overheating of catalyst is effectively precluded, due in part to the distribution of the oxygen and in part to the turbulence of the bed. The regenerated catalyst passes downwardly through the annular zone and a desired portion is withdrawn through line 12 while another portion is recirculated to the rising column in order to dilute the freshly supplied stream of contaminated catalyst and aid in the temperature control in the rising column, any desired amount of heat being dissipated by indirect heat exchange with a cooling fluid passing through the tubes 16 in the annular zone. When it is desired to obtain hot regenerated catalyst at a higher temperature than the temperature of the partially cooled and recirculated catalyst, a highly heated catalyst stream may be withdrawn from an elevated portion of the annular descending column through a suitable outlet conduit, not shown in the drawing, at an elevated point of the side wall of chamber 1. For this purpose also, the tubular heat exchanger system illustrated in the drawing may be modified so as to extend through only a lower portion of the annular zone, the upper portion of the latter being used primarily for disengaging and stripping entrained combustion gases or spent regeneration gases from the regenerated catalyst.

It is to be understood that the drawing of the apparatus is diagrammatic and it is not intended to limit the scope of this invention to the exact construction details illustrated and described, since minor changes in the arrangement and substitution of structural equivalents can obviously be made without departing from the scope of the invention. Further, it is not intended to limit the operation or use of the invention to only such treatments as involve contact between the vaporous or gaseous fluids and solid materials which have been specifically mentioned in the foregoing specification.

I claim as my invention:

1. Apparatus for non-mechanically contacting fluid mediums with sub-divided solid particles which comprises in combination, a substantially vertical chamber, a continuous partitioning wall positioned substantially vertically within said chamber and out of contact with the walls and ends of said chamber and providing thereby an inner contacting zone and a substantially annular recycle passageway, said partitioning wall terminating at a substantial distance below the upper end of said chamber whereby a separation zone is provided within said chamber above said inner contacting zone and annular recycle passageway, inlet means for introducing sub-divided solid particles and fluid to the lower portion of said inner contacting zone, vertically spaced tangential inlets projecting through said partitioning wall to said inner contacting zone, a conduit communicating with each of said tangential inlets, outlet means for withdrawing fluid products from the upper portion of said separation zone, and outlet means for withdrawing solid particles from said annular recycle passageway and said chamber.

2. The apparatus as defined in claim 1 further characterized in that said vertically spaced tangential inlets to said inner contacting zone are spaced at upwardly progressively increasing distances from one another along the partition wall.

3. The apparatus of claim 1 further characterized in the provision of a plurality of vertically spaced fixed fins projecting substantially perpendicularly from the interior surface of said partitioning wall.

4. Apparatus for non-mechanically contacting fluid mediums with sub-divided solid particles comprising in combination, a substantially vertical chamber, a continuous vertical partitioning wall positioned centrally within said chamber and spaced from the walls and ends of said chamber to provide thereby an inner substantially cylindrical contacting zone and a substantially annular recycle passageway, a plurality of vertically spaced fixed fins projecting substantially perpendicularly from the interior surface of said partitioning wall, an inlet to the lower end of said chamber for introducing sub-divided solid particles and fluid to said inner contacting zone and for maintaining a fluidized bed therein, vertically spaced tangential inlets to said inner contacting zone, said tangential inlets projecting through said partitioning wall, a conduit communicating with each of said tangential inlets whereby the latter may provide jet streams to said inner contacting zone and impart a rotative motion to said fluidized bed therein, said partitioning wall terminating at a substantial distance below the upper end of said chamber whereby a separation zone of greater cross-sectional area than that of the inner contacting zone is provided above the latter and within the upper portion of said chamber, particle separating means in the upper portion of said separation zone, a fluid outlet from said separation means and from said chamber, a solid particle outlet from the lower portion of said chamber below said annular recycle passageway, and baffling means within the lower portion of said chamber suitable for directing the cyclic flow of solid particles from the lower end of said annular recycle passageway to said inner contacting zone.

5. Apparatus for non-mechanically contacting fluid mediums with subdivided solid particles comprising in combination, a substantially vertical chamber, a continuous vertical partitioning wall positioned centrally within said chamber and spaced from the walls and ends of said chamber to provide thereby an inner substantially cylindrical contacting zone and a substantially annular recycle passageway, an inlet to the lower end of said chamber for introducing subdivided solid particles and fluid to said inner contacting zone and for maintaining a fluidized bed therein, vertically spaced tangential inlets to said inner contacting zone, said tangential inlets projecting through said partitioning wall and being spaced at upwardly progressively increasing distances from one another along the partitioning wall, a conduit communicating with each of said tangential inlets whereby the latter may provide jet streams to said inner contacting zone and impart a rotative motion to said fluidized bed therein, said partitioning wall terminating at a substantial distance below the upper end of said chamber whereby a separation zone of greater cross-sectional area than that of the inner contacting zone is provided above the latter and within the upper portion of said chamber, particle separating means in the upper portion of said separation zone, a fluid outlet from said separation means and from said chamber, a solid particle outlet from the lower portion of said chamber below said annular recycle passageway, and baffling means within the lower portion of said chamber suitable for directing the cycle flow of solid particles from the lower end of said annular recycle passageway to said inner contacting zone.

FREDERICK W. LEFFER.

REFERENCES CITED

The following references are of record in the file of this patent:

UNITED STATES PATENTS

| Number | Name | Date |
| --- | --- | --- |
| 1,213,887 | Krause | Jan. 30, 1917 |
| 2,374,518 | Wolk et al. | Apr. 24, 1945 |
| 2,419,097 | Stratford | Apr. 15, 1947 |